US010906651B2

(12) United States Patent
Roth et al.

(10) Patent No.: US 10,906,651 B2
(45) Date of Patent: Feb. 2, 2021

(54) COMPACT FUNCTIONAL ARRANGEMENT IN A CABIN OF A VEHICLE AND VEHICLE WITH SUCH A FUNCTIONAL ARRANGEMENT

(71) Applicant: AIRBUS OPERATIONS GMBH, Hamburg (DE)

(72) Inventors: Ingo Roth, Hamburg (DE); Bernd Roschat, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 328 days.

(21) Appl. No.: 15/921,333

(22) Filed: Mar. 14, 2018

(65) Prior Publication Data

US 2018/0201377 A1 Jul. 19, 2018

Related U.S. Application Data

(63) Continuation of application No. PCT/EP2016/065369, filed on Jun. 30, 2016.

(30) Foreign Application Priority Data

Sep. 30, 2015 (DE) .......................... 10 2015 116 585

(51) Int. Cl.
*B64D 11/06* (2006.01)
*B64D 11/02* (2006.01)
*B64D 11/00* (2006.01)

(52) U.S. Cl.
CPC .......... *B64D 11/0698* (2014.12); *B64D 11/02* (2013.01); *B64D 2011/0046* (2013.01)

(58) Field of Classification Search
CPC ................ B64D 11/0698; B64D 11/04; B64D 2011/0046; B64D 2011/0069; B61D 35/00; B61D 33/00; B61D 31/00
See application file for complete search history.

(56) References Cited

U.S. PATENT DOCUMENTS 2,650,368 A * 9/1953 Evans ........................ E03C 1/01
                                                               52/34
5,093,941 A * 3/1992 Muller ...................... A47K 4/00
                                                              4/479

(Continued)

FOREIGN PATENT DOCUMENTS

DE          10258384 A1      1/2004
DE      102010035375 A1      3/2012

(Continued)

OTHER PUBLICATIONS

European Patent Office, International Search Report for International Application PCT/EP2016/065369, dated Sep. 20, 2016, 2 pages.

*Primary Examiner* — Medhat Badawi
*Assistant Examiner* — Vicente Rodriguez
(74) *Attorney, Agent, or Firm* — Jenkins, Wilson, Taylor & Hunt, P.A.

(57) ABSTRACT

A functional arrangement in a cabin of a vehicle includes a monument with a housing having several side walls, which define an interior space, and at least two adjacently arranged seats each having a backrest and headrest. The seats adjoin an exterior side of a first side wall of the housing, and have a seating direction facing away from the first side wall. The first side wall includes a first surface portion that is located at least sectionally behind the headrests of the at least two seats in a vertical direction and includes at least one bulge extending at least in a horizontal direction between two adjacently lying headrests. At least one piece of equipment is situated in the interior space, extends into the at least one bulge and is usable in the interior space of the monument.

15 Claims, 16 Drawing Sheets

(56) References Cited

U.S. PATENT DOCUMENTS

| | | | |
|---|---|---|---|
| 5,358,067 A * | 10/1994 | Ford | A47B 5/04 |
| | | | 182/35 |
| D487,137 S * | 2/2004 | Itakura | D23/274 |
| 6,889,936 B1 | 5/2005 | Pho et al. | |
| 9,045,230 B2 * | 6/2015 | Burrows | B64D 11/0691 |
| 9,463,878 B2 * | 10/2016 | Cook | B64D 11/02 |
| 2010/0181425 A1 | 7/2010 | Guering et al. | |
| 2011/0139930 A1 | 6/2011 | Sutthoff et al. | |
| 2012/0325964 A1 | 12/2012 | Hawkins et al. | |
| 2014/0027574 A1 | 1/2014 | Obadia et al. | |
| 2014/0175219 A1 * | 6/2014 | Young | B64D 11/0023 |
| | | | 244/118.5 |
| 2014/0355282 A1 * | 12/2014 | Cuddy | B64C 1/1407 |
| | | | 362/471 |
| 2015/0129718 A1 | 5/2015 | Koyama | |

FOREIGN PATENT DOCUMENTS

| | | |
|---|---|---|
| DE | 102011011704 A1 | 12/2012 |
| DE | 102012003713 A1 | 8/2013 |
| EP | 2848530 A1 | 3/2015 |
| WO | 2014130590 A1 | 8/2014 |

* cited by examiner

COMPACT FUNCTIONAL ARRANGEMENT IN A CABIN OF A VEHICLE AND VEHICLE WITH SUCH A FUNCTIONAL ARRANGEMENT

CROSS-REFERENCE TO RELATED AND/OR PRIORITY APPLICATIONS

This application is a continuation of international patent application number PCT/EP2016/065369, having an international filing date of Jun. 30, 2016, which claims priority to German patent application number DE 102015116585.6, having a filing date of Sep. 30, 2015. The content of the referenced applications is incorporated by reference herein.

TECHNICAL FIELD

Embodiments of the invention relate to a functional arrangement in a cabin of a vehicle, as well as to a passenger cabin with such a functional arrangement.

BACKGROUND

Vehicles that are used for transporting passengers and comprise a cabin with passenger seats arranged therein are usually conceived with economic considerations in mind, and often provide the highest possible passenger capacity. In particular given longer distances to be covered by the vehicle, additional equipment features are necessary apart from the integration of passenger seats so as to ensure the wellbeing of the passengers. For example, several toilets are necessary, which are provided in self-contained cabin monuments.

Increasing passenger capacity at constant vehicle dimensions is difficult to do without compromising passenger comfort. There are known concepts for skillfully equipping in particular cabin monuments with several functions, thus yielding an advantage in utilizing the existing installation space.

For example, patent publication DE 102011011704 A1 shows a module cabin segment for a vehicle with adjacently arranged segment modules, e.g., wherein one accommodates a toilet arrangement with at least one toilet room, and another can have kitchen equipment. At least one of the modules may comprise a vehicle attendant seat, which is mounted so that it can unilaterally pivot on the module in question.

Patent publication DE 102010035375 A1 presents an arrangement for accommodating passengers in a means of transport, which comprises a first space, a second space and a third space, which are situated adjacent to each other on a shared storage area, wherein two of the spaces are equipped with a receiving unit for accommodating passengers, while one of the spaces holds a storage locker.

BRIEF SUMMARY

An object of the disclosure is to propose another arrangement in a cabin of a vehicle, and in particular of an airplane, which permits a better use of the space in the passenger cabin, and yet offers a high level of comfort.

This object is achieved by a functional arrangement with the features in claim 1. Advantageous embodiments and further developments may be gleaned from the subclaims and following description.

Proposed is a functional arrangement in a cabin of a vehicle that comprises a monument with a housing comprising several side walls, which define an interior space, and at least two adjacently arranged seats each having a backrest and headrest, wherein the seats adjoin an exterior side of a first side wall of the housing, and comprise a seating direction facing away from the first side wall. The first side wall comprises a first surface portion that is located at least sectionally behind the headrests of the at least two seats in a vertical direction and comprises at least one bulge extending at least in a horizontal direction between two adjacently lying headrests. Situated in the interior space is a piece of equipment that extends into the at least one bulge and is usable on a first inner wall facing the first side wall.

The functional arrangement is a spatially compact arrangement of several elements, which each provide a different function in the arrangement, but as a result of the special arrangement symbiotically lead to an improved space utilization inside of the vehicle. According to the disclosure, an upper area of the housing of a monument is advantageously designed on one side and in particular equipped with passenger seats, wherein this design preferably does not detract from the personal comfort of the people located on the seats.

A monument, which is often also referred to as a cabin monument, is a larger fitment that can be placed in a passenger cabin, and serves a specific, in particular technical, purpose. Examples of the latter include onboard kitchens (galleys), washrooms or toilets or stowage compartments and rest areas. The latter often extend from a floor in the cabin in the direction of a cabin ceiling, and often comprise a housing enclosed by side walls on multiple sides, which defines an interior space. The interior space can provide the fixtures necessary for the desired functions, and supply them with necessary operating materials, such as electricity, air, water and the like, or remove the latter. Finally, which operating materials and the like are provided is not of great relevance in terms of the core principle of the functional arrangement according to the disclosure.

In particular, the at least two adjacently arranged seats can be passenger seats for accommodating passengers in the cabin of the vehicle. The backrest and headrest of a respective seat are to be designed just as for a conventional seat. The characteristic feature lies in the fact that these seats adjoin an exterior side of the first side wall of the housing, i.e., are located directly against or in front of the first side wall, and are possibly also mechanically joined with the latter. Presented further below are different variants for integrating the seats.

The seating direction facing away from the first side wall coincides with the viewing direction of a user located on the seat when he or she is actually located on the latter, and leans against the backrest with his or her back, or his or her back faces the backrest. Consequently, the seating and viewing direction is orthogonal to the first side wall.

The first surface portion of the first side wall is a segment or a part of the first side wall, extends in a vertical direction, and, for example, runs behind the headrest or along the headrest. Depending on the design of the seat, at least sections of a headrest can also be fastened to the first surface portion if a pivoting motion of the seat is not desired.

Another core aspect of the disclosure lies in the at least one bulge, which is a three-dimensional, rounded deviation in shape toward the outside, i.e., facing away from the interior space. Positioning this at least one bulge between two adjacently lying headrests makes it possible to utilize a space that exists there on the exterior side of the monument and is not necessary for the personal comfort of the seated person so as to stow a piece of equipment in the interior space of the monument in a very space-saving manner. Given the outwardly directed bulge, the latter only extends slightly into the interior space if at all, so that an at least regionally continuously smooth, flat front can be created there.

In an advantageous embodiment, the bulge comprises a first vertical section, which has an essentially constant first profile cross section lying in a horizontal plane. Consequently, the shape of the bulge corresponds to a body that would arise by extruding the first profile cross section along a straight stretch, whose length corresponds to the height of the first vertical section. This yields a vertically upwardly extending, outwardly protruding installation space in the interior space of the monument that is usable for varying purposes. It makes sense to equip the profile cross section with a contour that follows the contour of a washbasin or the like. As a result, a washbasin can be placed in the bulge, and additional installation space is also created for accommodating other pieces of equipment, such as towel rails, soap dispensers or the like.

In an advantageous embodiment, it may be beneficial for the first profile cross section to be bordered by a circular arc on a side facing away from the interior space. This enables a very harmonious, readily utilizable configuration of an installation space, which in particular is tailored to a conventionally designed, round washbasin.

However, it may also be expedient for reasons of production efficiency for the first profile cross section to be bordered on a side facing away from the interior space by a flattened or rounded triangle or a symmetrical trapezoid with at least partially rounded corners. This makes it possible to use several flat surfaces that adjoin each other, and thus create the bulge.

To give the first side wall an especially harmonious configuration, the bulge can further comprise an outlet area, which is situated underneath the first vertical section and incorporates a profile cross section that runs out from the first profile cross section into the first surface portion. An abrupt tapering or kind of recess under the bulge would visually not be particularly advantageous, and could also facilitate the risk of inadvertent bumping, and hence the danger of injury.

A lower end of the bulge can especially preferably lie between the headrests of the at least two passenger seats. As a result, any detriment to the comfort of a user seated on the seat can be completely avoided, while still allowing the use of a washbasin having a linear funnel shape, in particular given a linear configuration of the outlet area.

In an embodiment, the housing may comprise an interior floor located vertically above a cabin floor, on which the housing rests. Because the vertical position of the bulge is limited as a function of the seats on the first side wall, it is necessary to adjust the height of the piece of equipment that is using the bulge thereto. As a consequence, the height in particular of a washbasin or some other piece of equipment can exceed a conventional installation height as viewed from the cabin floor. It may thus make sense to compensate for this difference in height with an elevated inner floor.

However, the functional arrangement may also comprise an interior floor having the same height as the cabin floor surrounding the housing or the functional arrangement may use the cabin floor as the interior floor. This may, for example, be possible, if the bulge and the interior equipment, such as a small wash basin, are designed to have corresponding contours, such that the wash basin snugly fits into the interior space defined in the respective bulge. The installation height of the wash basin may be slightly larger than commonly in lavatories, but a step or a higher interior floor are not necessary. The access height of the wash basin is in an ergonomically acceptable height, which may exemplarily be at a maximum of 1 meter. Of course, this is subject to considerations of a detail design, such that this maximum may be varied by a few centimeters.

In a likewise advantageous embodiment, the first side wall underneath the first surface portion comprises a second surface portion, which is pivoted in relation to the first surface portion around a horizontal axis parallel to the first surface portion, and extends outwardly from the first surface portion. The second surface portion may comprise an alignment relative to the cabin floor that corresponds to a pivoted back or partially pivoted back passenger seat. This yields installation space inside of the monument that is provided close to the floor, and in particular may accommodate supporting systems that are not visible.

The second surface portion may be pivoted by an angle of up to 45° from a vertical. However, it may be beneficial for reasons of space to either make the respective seat non-pivoting in design, or limit the pivoting to an angle of 20 to 30°, for example.

In an embodiment, a side wall directly adjoining a toilet in the interior space may comprise a curvature, so that the respective side wall extends over the toilet. The exterior side of the respective side wall may accommodate a stowage compartment, which enhances the housing to yield essentially a square shape. The housing of the monument may be adjusted to the curvature of the vehicle fuselage, for example, so that the functional arrangement may be integrated into laterally outlying areas of the cabin. In order to reduce the diversity of installable components in the cabin, it may be beneficial to also arrange such housings with a curved side wall in central areas of the cabin, in which a curvature is not required. The resultant installation space may be utilized by a stowage compartment, which enhances the housing to yield a square shape.

As already stated above, the at least one piece of equipment may vary in design. The latter may comprise at least one element from a group of elements, with the group comprising a wash basin, a stowage compartment, a soap dispenser, a towel dispenser, toilet seat covers, sickness bags and the like, a compartment for keeping toilet paper, and a trash receptacle.

If in particular cost and weight considerations rule out an inner floor, the functional arrangement may further comprise at least one foldably or pivotably mounted tread on the first inner wall for selectively elevating the vertical position of a user in the interior space of the housing. For example, the tread could be able to pivot on a hinge on the inner wall vertically upward, or from a vertical position around the hinge into a horizontal position. In order to support the tread on an edge facing away from the hinge, that location could have supports, stops or other means that establish a surface contact with the floor inside of the monument. The latter may preferably also be pivoted, so that they disappear flush into or behind the tread with the tread folded back. Alternatively thereto, however, the hinge may also be designed so as to reliably carry a maximum weight of a user when the tread is in a horizontal state.

The first inner wall may further comprise a base area, which is offset toward the first side wall or runs at an inclination from the floor of the housing in the direction of the interior space. As a result, a user may come up very close to the first inner wall, with enough space being available in the base area for the feet.

It is especially preferred that the interior space be designed as a washroom that comprises a toilet and washing facilities. The interior space may further comprise two washrooms separated from each other, the separation between which may preferably also be eliminated if need be, for example by providing foldable partitions or the like. As a result, two separate washrooms may temporarily also be turned into an accessible toilet whenever necessary.

The disclosure further relates to a passenger cabin for a vehicle comprising a plurality of seats and at least one such functional arrangement. It makes sense to position the functional arrangement in particular in a door area of the passenger cabin.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Additional features, advantages and possible applications of the present disclosure may be gleaned from the following description of exemplary embodiments and the figures. All described and/or graphically depicted features here comprise the subject matter of the disclosure whether taken in isolation or in any combination desired, even independently of their composition in the individual claims or back references thereto. Furthermore, identical references on the figures stand for the same or similar objects.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
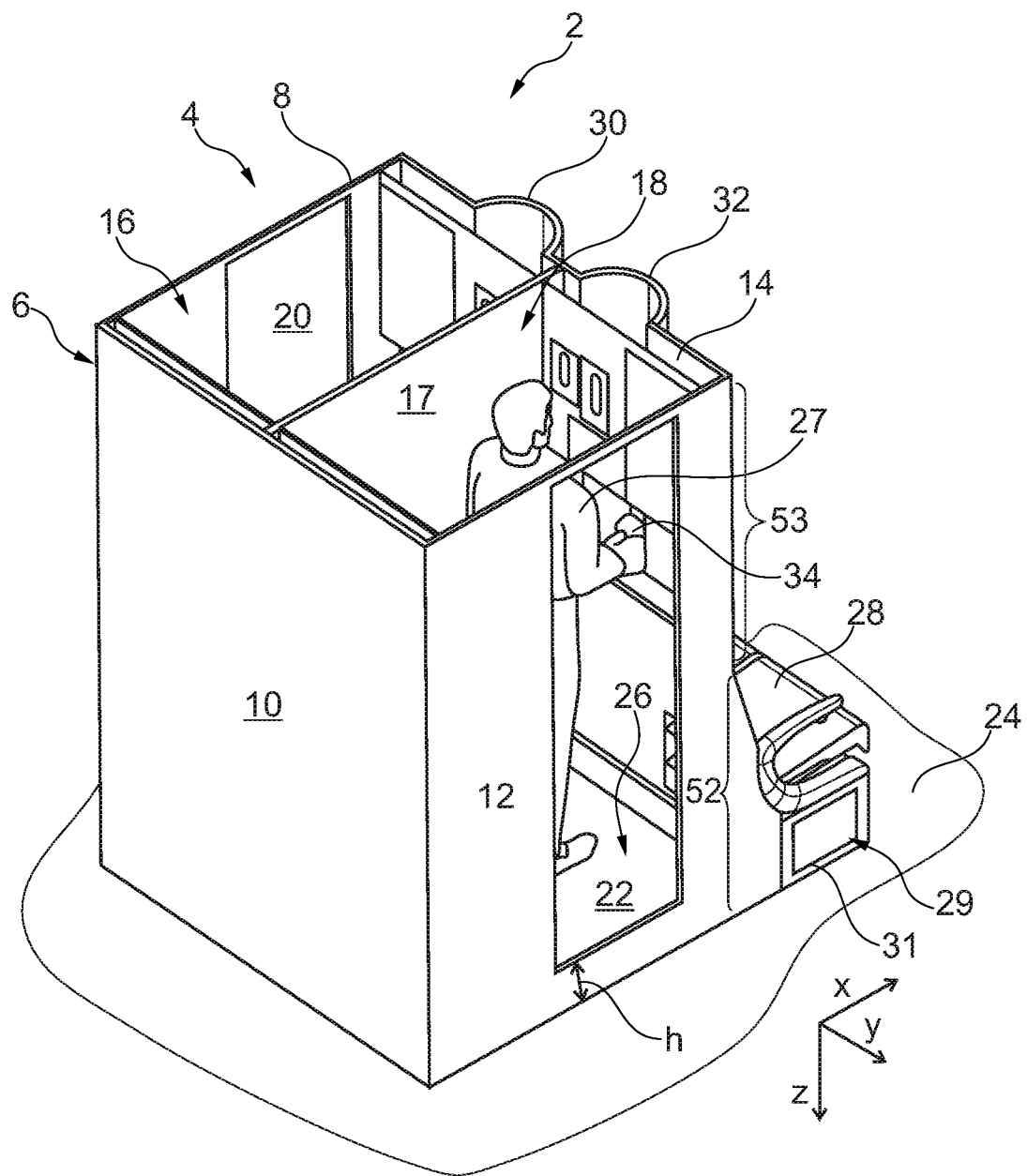
FIGS. 1 to 6 show partially cut two- and three-dimensional illustrations of a first exemplary embodiment of a functional arrangement.

FIG. 1 shows a two-dimensional, partially cut illustration of a functional arrangement 2 with a monument 4 that comprises a housing 6 with side walls 8, 10, 12 and 14, which are arranged at a right angle relative to each other strictly by way of example. Located inside the housing 6 are two washrooms 16 and 18, which are separated from each other and may each be entered through an entrance 20 and 22. A wall 17 situated between the washrooms 16 and 18 may be at least partially removed or folded up, so as to combine the washrooms 16 and 18 into a single washroom and make it easier to use by a person with limited mobility, since a wheelchair may be parked in particular in an area of the then enlarged washroom. The monument 4 or housing 6 is arranged on a cabin floor 24, and additionally comprises a separate inner floor 26, which is spaced apart in a vertical direction from the cabin floor 24 by a distance h. A user 27 located in the washroom 16 or 18 thus takes at least one step up so as to get into the corresponding washroom 16 or 18.

Positioned on the side wall 14, which below will be referred to as the "first side wall" 14, are several adjacently arranged passenger seats 28, which adjoin the housing 6 toward the front in the longitudinal direction x of the vehicle. The latter exemplarily comprise an integral part of the functional arrangement 2, and are fastened thereto on a pedestal 29, for example, which could comprise a stowage compartment accessible from outside, as denoted by an access flap 31.

As illustrated more clearly on the following figures, the first side wall 14 comprises bulges 30 and 32, which face in the same (longitudinal) direction and extend up to between two headrests of the passenger seats 28. The room created in the respective interior space of the washroom 16 or 18 may be used for a piece of equipment, and in particular for a washbasin 34, so that the latter does not protrude into the space of the respective washroom 16 or 18, allowing the latter to comprise a very compact design inside.

Figure 2:
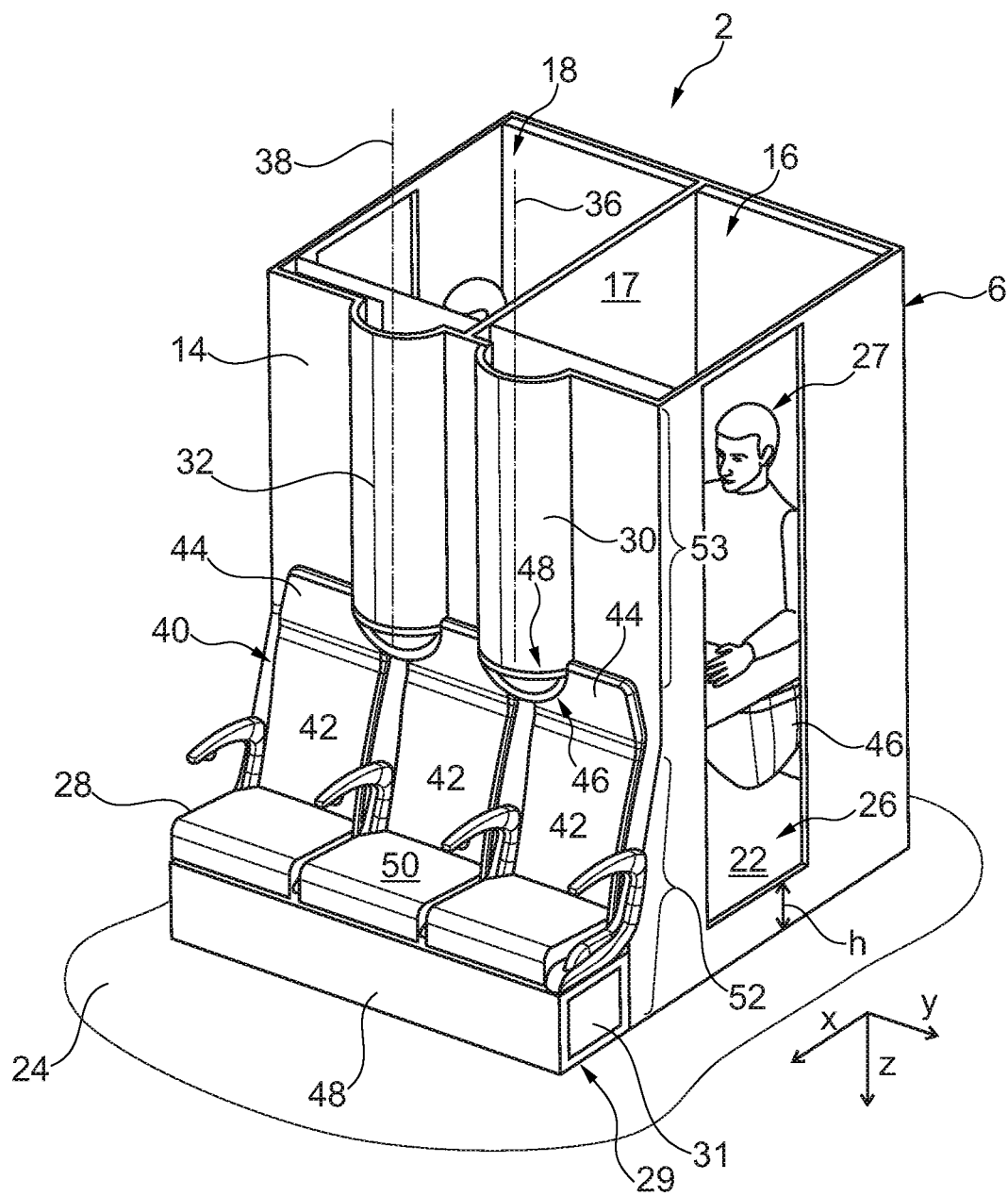

FIG. 2 presents an illustration rotated by 180°, which shows the first side wall 14 with its bulges 30 and 32 in the foreground. The bulges 30 and 32 are here each provided with a semicircular cross section solely by way of example, so that the bulges extend along the first side wall 14 in the form of half a hollow cylinder with a respective central axis 36 or 38 vertical to the longitudinal direction x, i.e., parallel to the vertical direction z. The adjacently arranged passenger seats 28 each comprise a back side 40 on a backrest 42 directed toward the first side wall 14. Located above the backrests 42 are headrests 44, which on an inner area or on either side of the middle passenger seat 28 each comprise a recess 46 for holding a receptacle for an outlet area 48 of a bulge 30 or 32. The latter may be roughly shaped like a spherical segment, so that its extension in the x-direction tapers from the first side wall 14 downward.

As a consequence, the functional arrangement 2 may be used to make a monument 4 with washrooms 16 and 18 located therein especially compact in design, since in particular a washbasin 34 may be situated in a bulge 30 or 32 lying above the usable space of passenger seats 28 in front of the first side wall 14. In order to impede passengers on the passenger seats 28 as little as possible, the inner floor 22 may be situated at a height h where only the outlet area 48 of the bulges 30 or 32 lies between the headrests 44.

As further evident from FIG. 2, a toilet 46 may be located on the inner, opposing side of the first side wall 14, wherein the viewing direction of a user 27 situated thereon faces toward the first side wall 14.

The passenger seats 28 may exemplarily be placed on a type of pedestal 48 at a lower end of the first side wall 14, eliminating the use of a conventional seat frame. Alternatively thereto, a conventional seat frame may be used, and covered by a lining underneath seat surfaces 50. In order to give the monument 6 an especially ergonomic design, a lower area of the housing 6 is beveled in the area of the first side wall 14, so that backrests 42 run parallel to this area of the first side wall 14 in their neutral position, for example. The backrests 42 may nonetheless be pivoted (to a limited extent) to assume a more comfortable position by providing a specific distance between the backrests 42 and beveled area 52, which may also be referred to as a second surface portion and is pivoted relative to the first surface portion 53 around a horizontal axis parallel to a first surface portion 53 located vertically over it, and extends outwardly from the first surface portion 53. In addition, the installation space produced by the second surface portion 52 may be used for accommodating systems or other fixtures that support the function of the washrooms 16 and 18.

Figure 3:
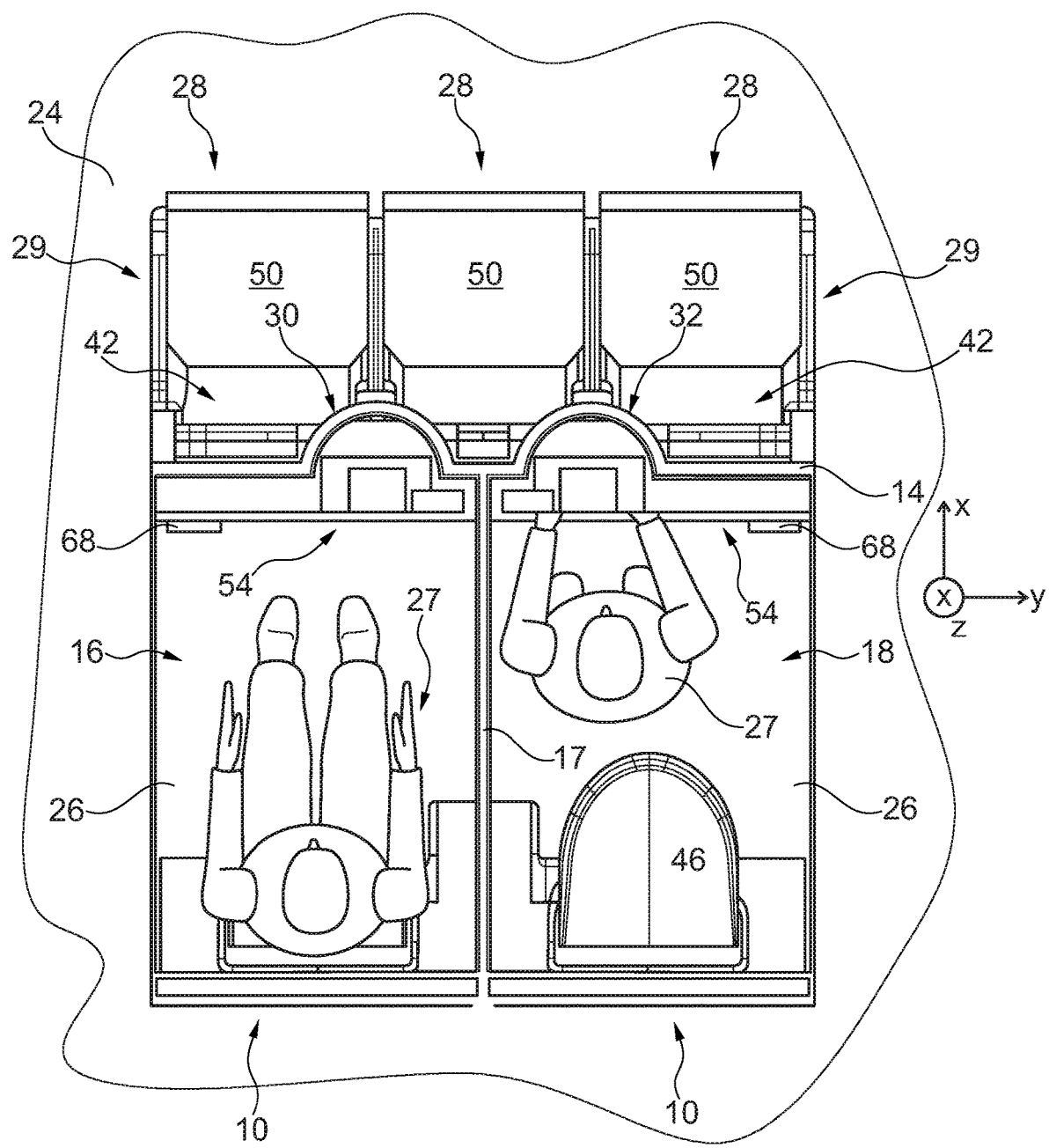

FIG. 3 shows a simplified inner structure of the washroom 16 and 18 in a top view of the functional arrangement 2 with a cut housing 6. It depicts especially clearly the installation space that may be created by the bulges 30 and 32 inside the washrooms 16 and 18 so as to provide pieces of equipment, such as a washbasin 34 (not visible in this illustration). A user 27 inside of the respective washroom 16 or 18 will perceive a largely planar functional wall 54, which is located behind the first side wall 14 and situated opposite the side wall 10, against which a respective toilet 46 abuts in a flush manner. By using bulges 30 and 32, the distance between the functional wall 54 and the rearward side wall 10 may be made tangibly smaller than possible with conventional washrooms. As a result, considerable space may be produced for integrating additional passenger seats 28 on the exterior side, noticeably improving the space available in the cabin that accommodates the functional arrangement 2.

Figure 4:
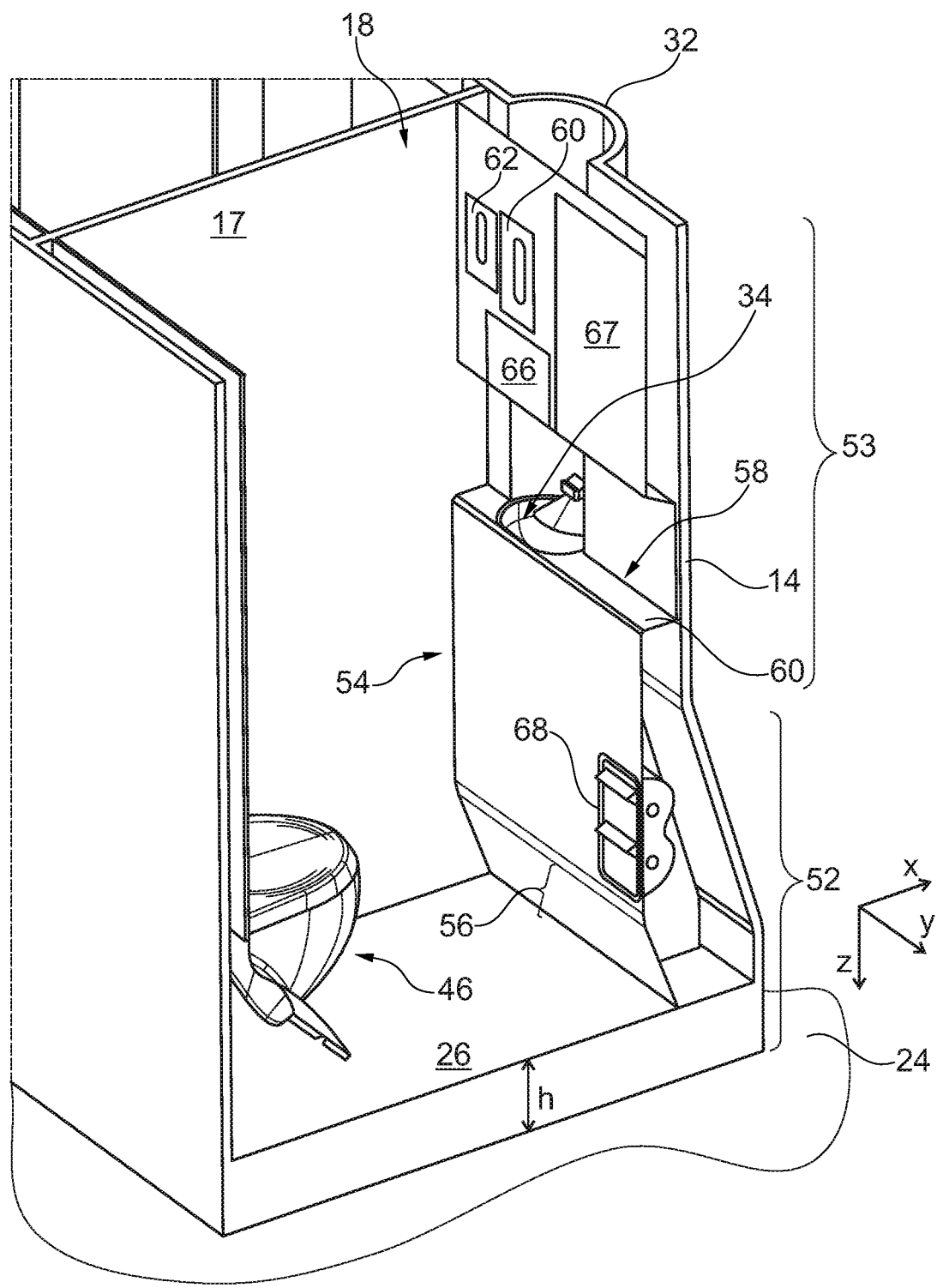

One possible, but only exemplarily depicted embodiment of the functional wall 54 is visible on FIG. 4. Shown here is an essentially planar surface of the functional wall 54, which in a base area 56 comprises a slight bevel toward the first side wall 14. This allows a user to approach the functional wall 54 relatively closely, with enough space being available for his or her feet. Situated at an ergonomic height, e.g., of between 85 cm to 110 cm, is a recess toward the first side wall 14, in which a washbasin 34 extends. The horizontal surface portion 60 formed by the recess 48 is usable as a support surface for various objects of a user.

Shown to the right next to the washbasin 34 on FIG. 4 is a closable filling hole 61, abutted from below by a waste receptacle 63. The latter may be emptied from outside of the housing 6 through an access device, element, or means 65, such as a flap. It is further conceivable that the access means 65 may assume several positions. In a first position, the access means 65 closes a side part of the waste receptacle 63. In a second position, the access means 65 allows access to the refuse collected in the waste receptacle 63, and permits removing the latter from the waste receptacle 63. In a third position, a system located next to, behind or under the waste receptacle 63 may be serviced, for example a device for heating water, which is not shown on FIG. 4. This eliminates the need for access holes, flaps and the like inside the monument, thus yielding fewer gaps in the interior space, which ultimately improves hygiene and cleanability.

For example, at a height of 30 cm or more above the support surface 60, the functional wall 54 again extends further into the interior of the respective washroom 18, for example aligned with the part of the functional wall 54 located under the recess 38. Alternatively, the surface located above the support surface may also extend into the interior space to somewhat less of an extent than the support surface, so as to open a view on the washbasin 34.

For example, the functional wall incorporates various compartments 62, 64 and 66 for holding different things, such as towels and the like. The accompanying receiving volumes may likewise extend into the bulge 32. A mirror 67 may be located on the functional wall 53 further to the outside and in particular partially next to the bulge 32, without taking up any significant installation space. Toilet paper dispensers 68 may also be located under the support surface 60, for example also a waste receptacle (not depicted).

Since there is significant installation space between the first side wall 14 and functional wall 54 in particular given a beveled area 52 of the first side wall 14, necessary systems used for the functions of water supply and disposal may be located in this installation space.

Figure 5:
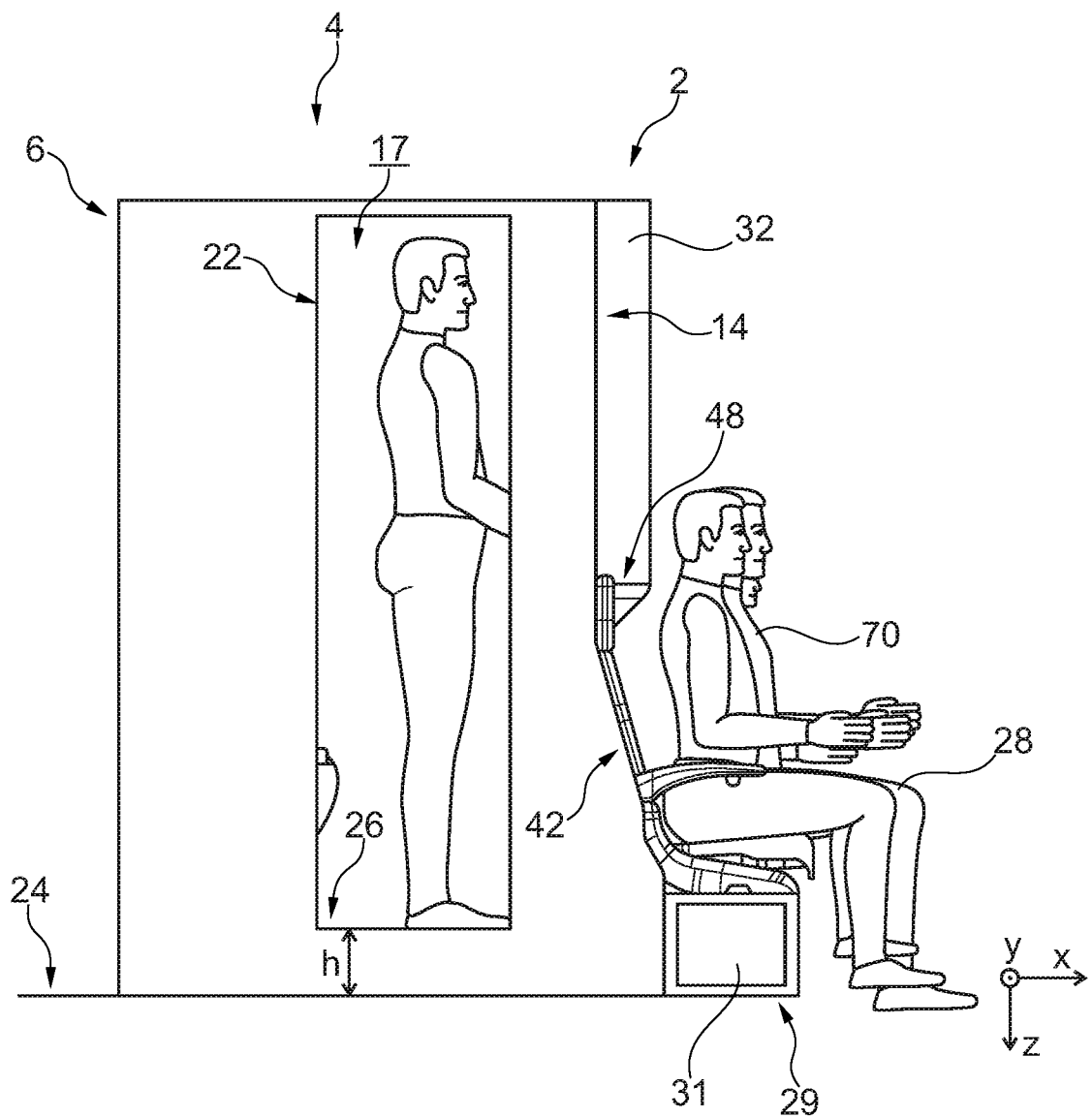

FIG. 5 shows a side view of the functional arrangement 2, which in particular illustrates the difference in height between the inner floor 22 and cabin floor 24, along with the integration of passenger seats 28 on the first side wall 14. Because the installation space next to the headrests 44 that is occupied by the outlet area 48 of the visible bulge 32 is relatively slight in a vertical direction due to the outgoing shape, it may be assumed that only a very slight influence is exerted on a passenger 70 on one of the passenger seats 28.

As further evident from this illustration, a backrest 42 could be situated flush against the first side wall 14, so that the passenger 70 located on the passenger seat 28 cannot adjust the backrest. However, this is only an example, since a backrest 42 may also be made to tilt back at least slightly by selecting a somewhat greater distance between the backrest 42 and first side wall 14.

Figure 6:
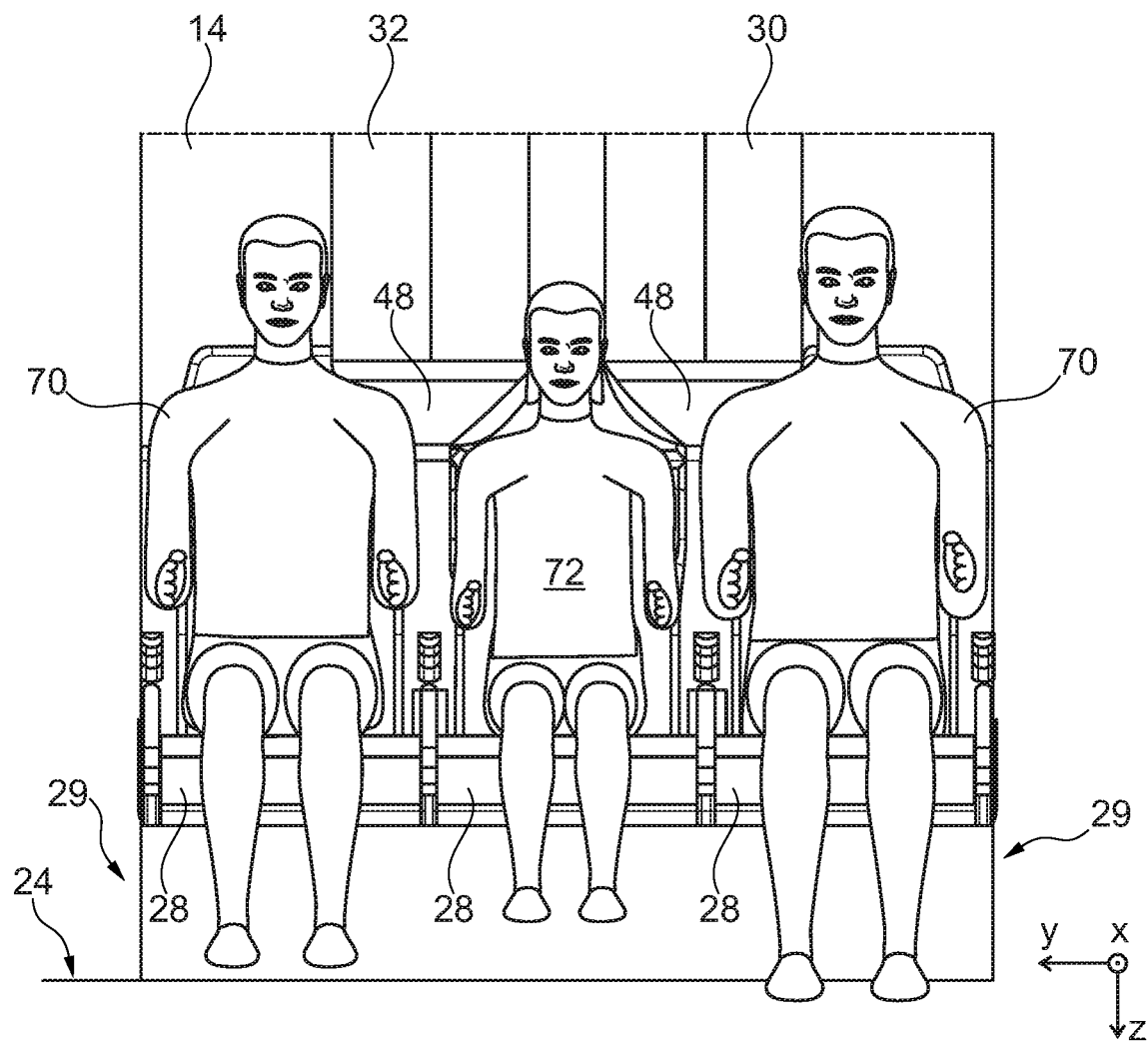

In a front view of the functional arrangement 2, FIG. 6 depicts three adjacently arranged passenger seats 28 with seated passengers 70 (outer seats) and 72 (inner seat). The passengers 70 depicted on the outer seats are in the 95th percentile of American men from an anthropometric standpoint, while the passenger 72 on the middle seat is in the 5th percentile of Japanese women from an anthropometric standpoint. Given the exemplary body types shown, passengers may sit on the passenger seats 28 offered here without having to put up with any noticeable limitations on comfort.

Figure 7:
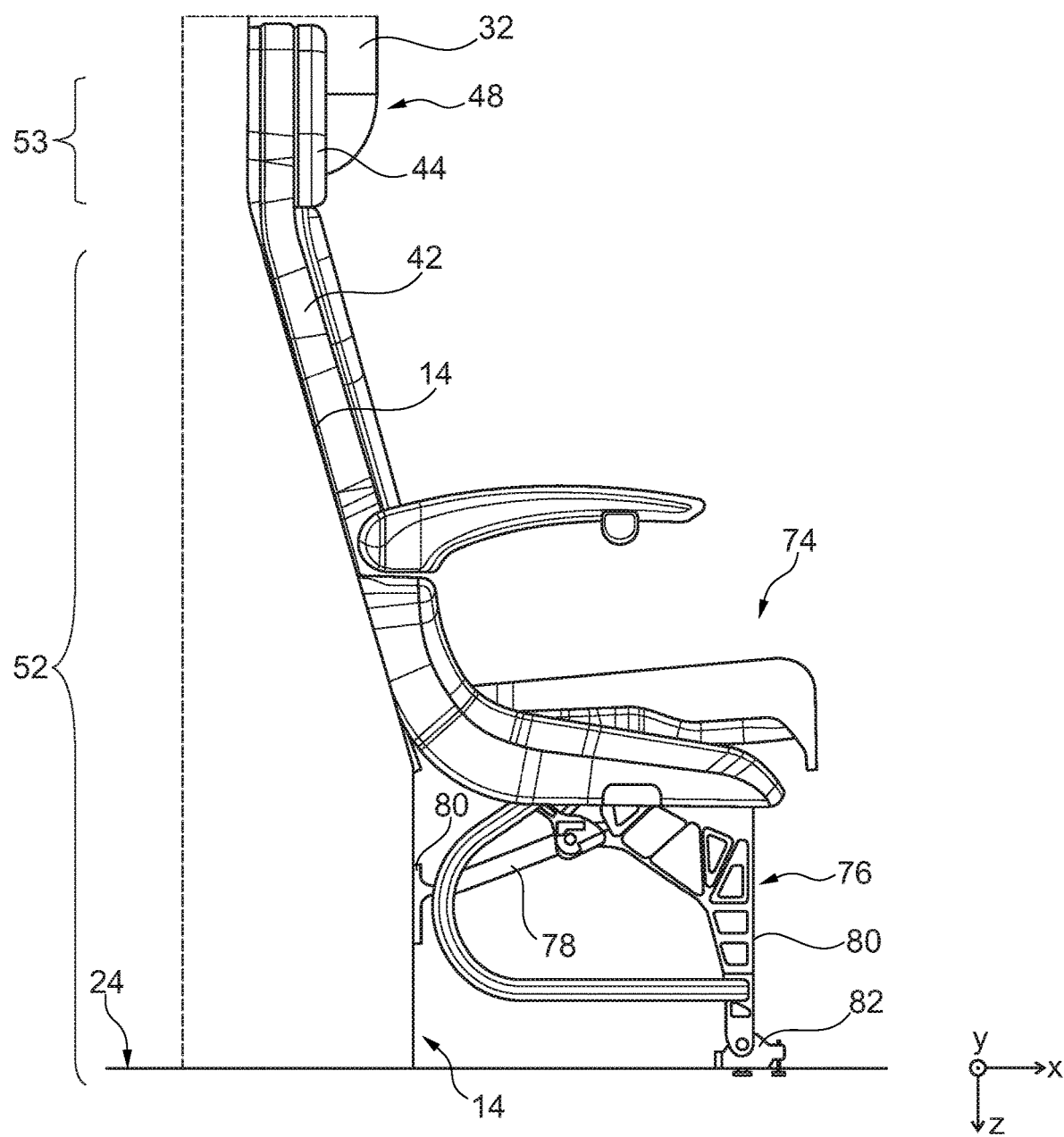
FIG. 7 shows a modified variant of a seat placed on the functional arrangement.

As mentioned above, a passenger seat may be completely integrated into the structure of the functional arrangement 2 in a variety of ways. FIG. 7 presents a variant of a passenger seat 74 in which a seat frame 76 may be designed in a conventional manner, wherein a rear seat leg 78 has been redesigned so that it may be bolted or otherwise fastened to a base area of the first side wall 14 with a flange 80. The loads in a 16 G loading test underlying the approval are primarily introduced in the front seat leg 80, which is locked in a seat rail (not shown here) in the cabin floor 24 by way of a locking mechanism 82.

Figure 8:
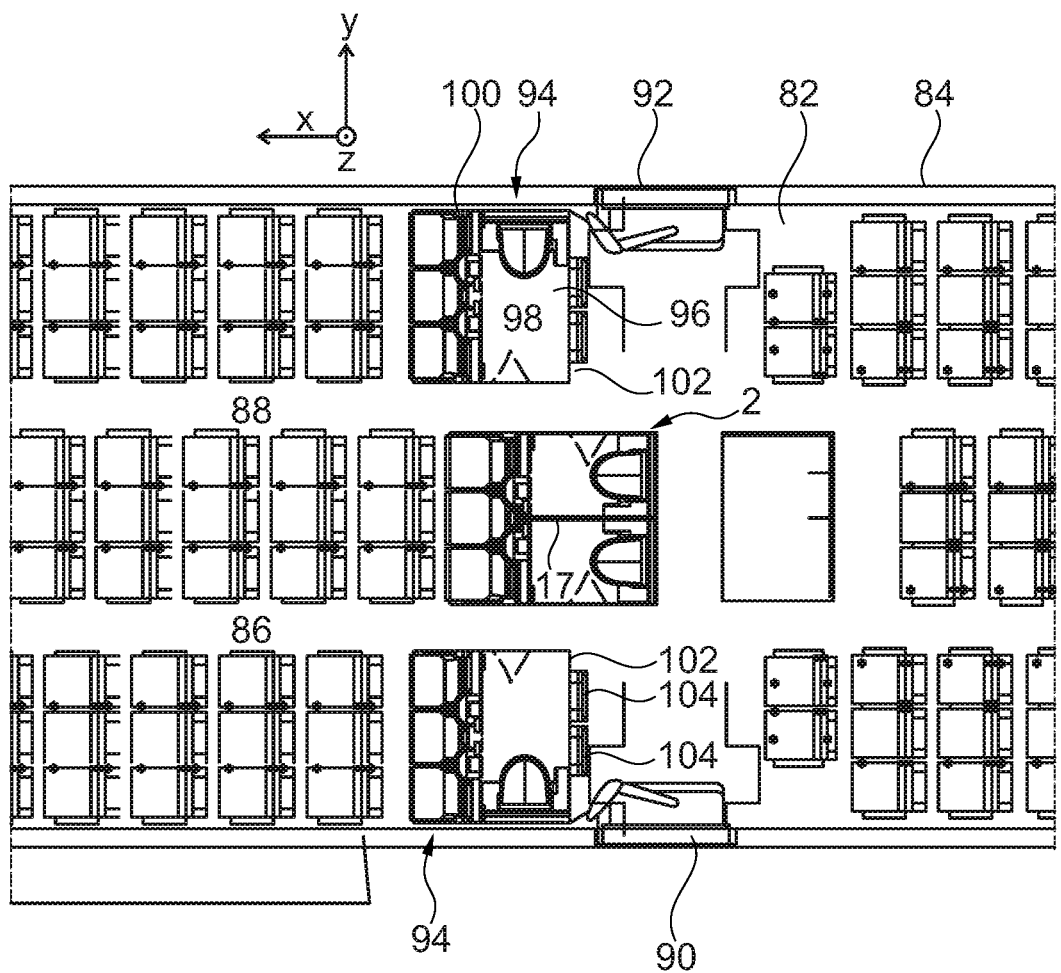
FIG. 8 discloses a passenger cabin of a vehicle with a functional arrangement positioned therein.

FIG. 8 discloses a cabin 82 of an airplane with an airplane fuselage 84, wherein the cabin 82 is equipped with two aisles 86 and 88 running parallel to each other. Situated in an area lying between two doors 90 and 92 are a total of three functional arrangements 2 or 94, wherein the functional arrangement 2 is positioned between the two aisles 86 and 88, and the functional arrangement 94 outside of the respective aisle 86 or 88. While the centrally positioned functional arrangement 2 essentially corresponds to the one on FIGS. 1 to 7, the functional arrangements 94 have been modified somewhat. A washroom 96 is provided there, whose alignment runs transverse to the longitudinal direction x of the cabin 82, so that only a very slight extension in the longitudinal direction is necessary when integrating just a single toilet 98. Correspondingly, the first side wall 100 of the functional arrangement 94 runs parallel to the primary extension direction of the washroom 96. As a result, an especially narrow configuration of a washroom 96 may be realized in particular in an area lying very close to a door 90 or 92, which results in the additional integration of three seats. It makes sense to arrange one or two flight attendant seats 104 on a side wall 102 lying directly in front of the doors 90 or 92, which are foldably integrated on the corresponding side wall 102.

Figure 9:
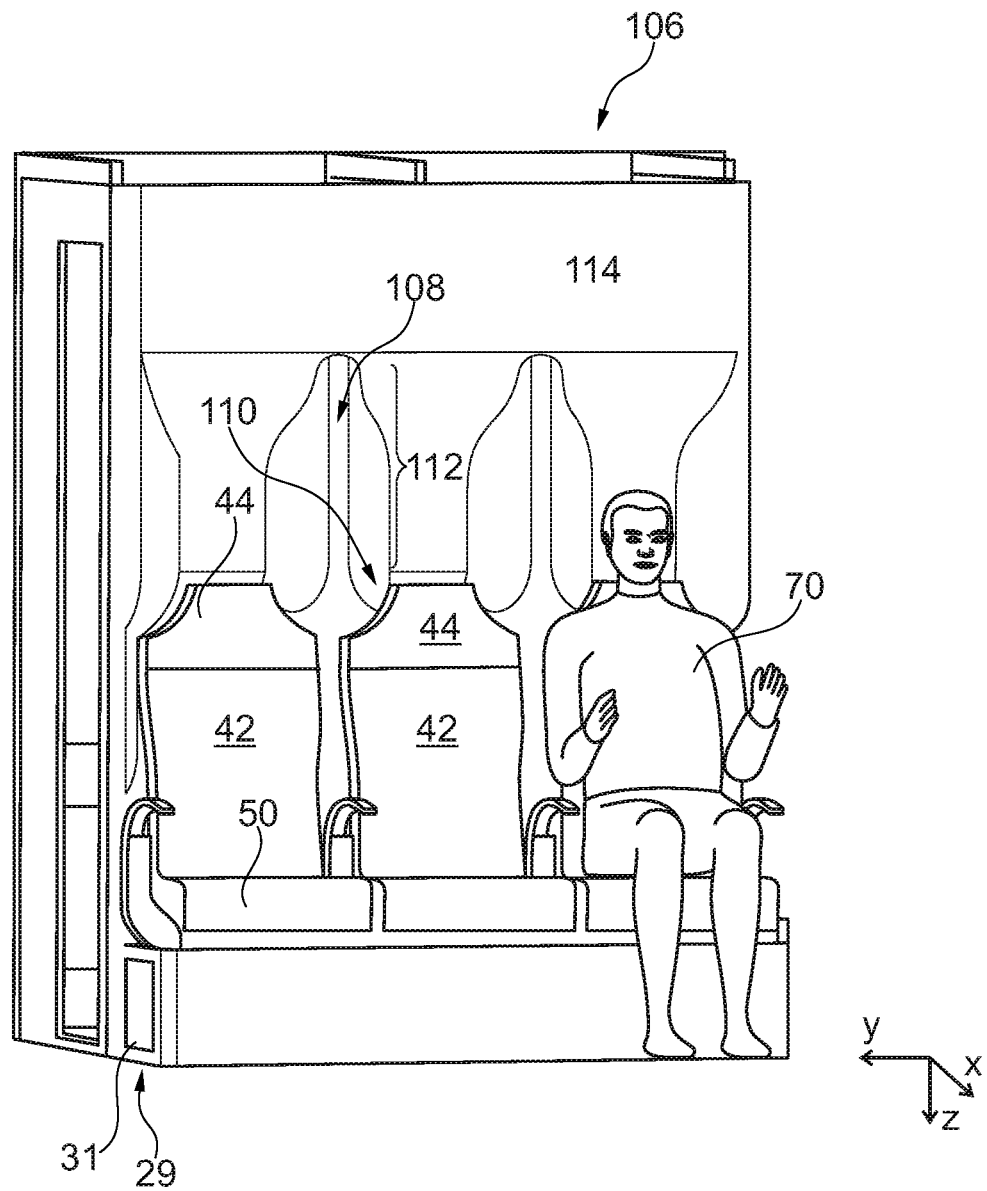
FIGS. 9 to 11 show another exemplary embodiment of a functional arrangement.
Figure 10:
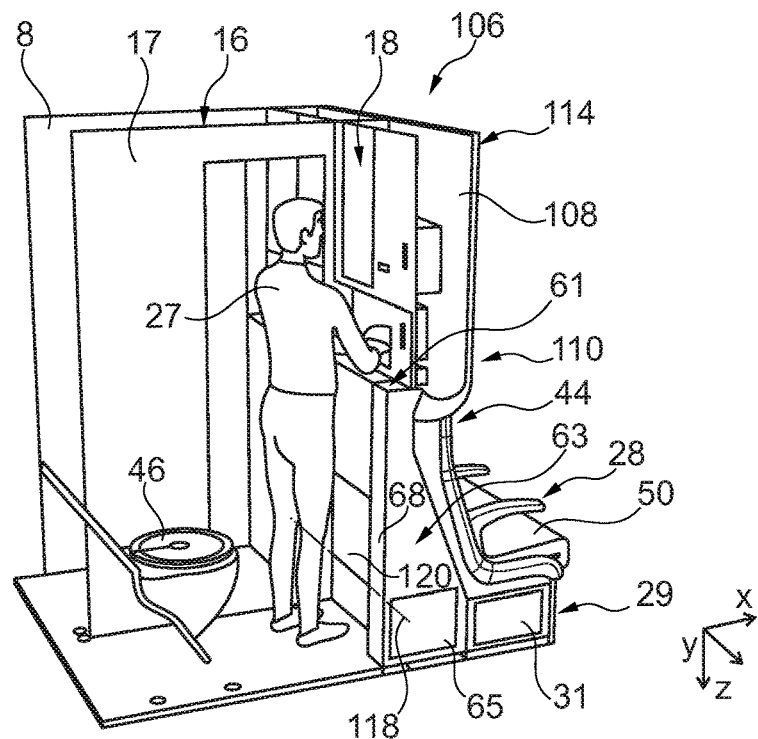
Figure 11:
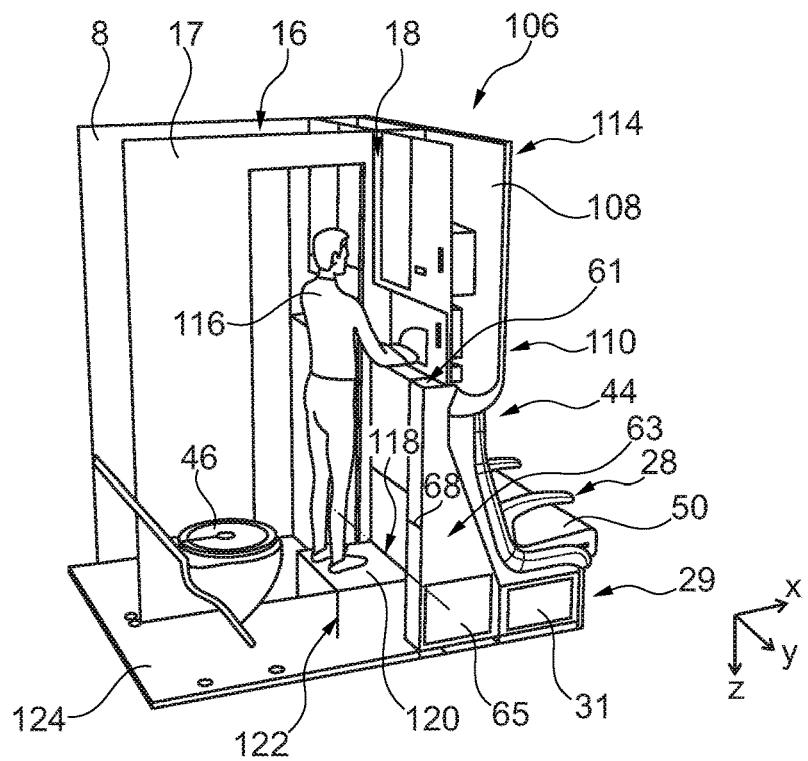

FIG. 9 to FIG. 11 show a modification in the form of a functional arrangement 106 that essentially corresponds to the functional arrangement 2 and has two washrooms that may be separated from each other by a partition 17, but comprises divergently configured bulges 108. The latter have an essentially symmetrical trapezoidal profile in the x-y plane, and a multilaterally rounded outlet area 110 that extends between two headrests 44. A vertical area 112 of the bulges 108 is comparably short, since a larger bulge 114 adjoins an upper side of the functional arrangement 106, extending over the entire width of the functional arrangement 106, into which the bulges 108 run in a flush manner. As shown on FIGS. 10 and 11, this provides a distinctly larger installation space.

FIG. 11 exemplarily depicts a user 116 having a distinctly smaller body size than a user 27 on FIG. 10. Instead of an inner floor 26 as shown on FIG. 1, use is made of a tread 120 mounted so that it may pivot around a horizontal axis 118, which if need be a user may fold from a vertical stowed position into a horizontal use position. In the illustration presented on FIG. 11, the user 116 stands on the tread 120, which in turn is supported on the floor 124 in the functional arrangement 106 by way of foldable supports 122. The stowed position is visible on FIG. 10.

Figure 12:
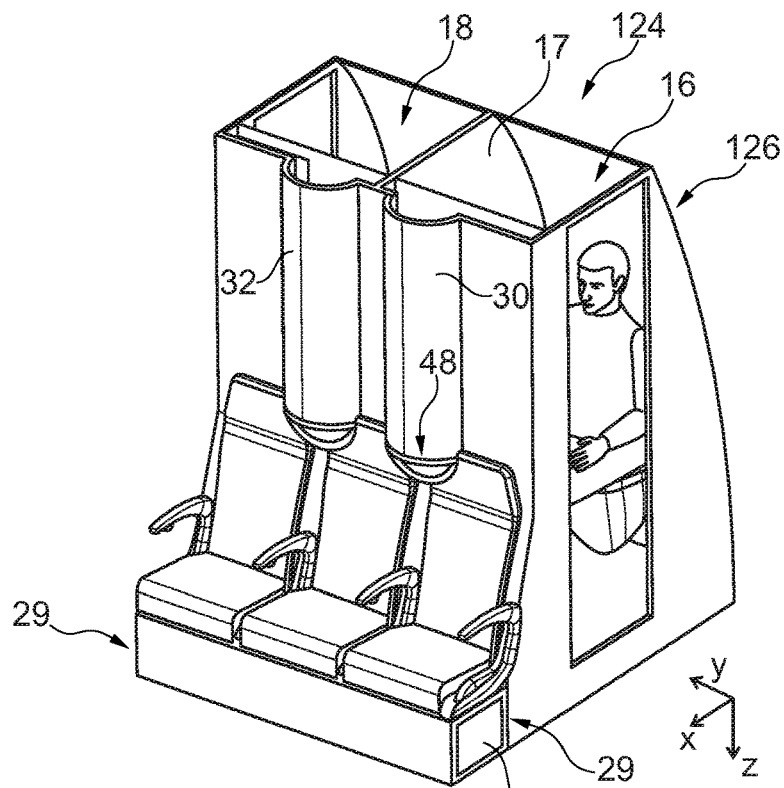
FIGS. 12 and 13 show another exemplary embodiment with a side wall that follows the curvature of a vehicle fuselage.
Figure 13:
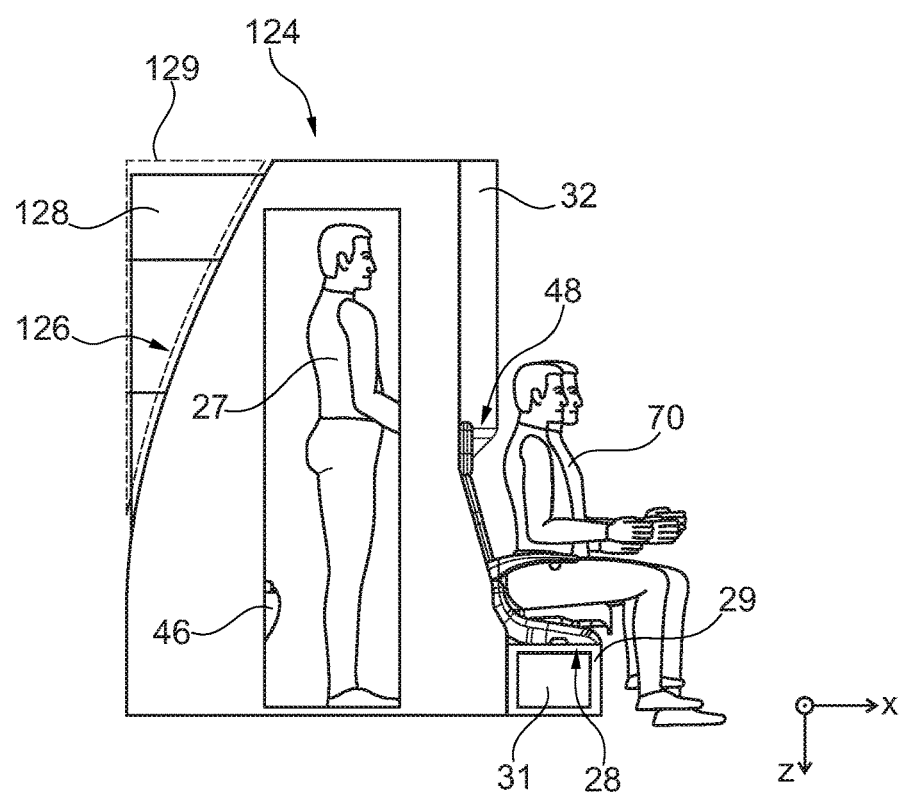

The principle known from FIG. 1 is depicted on FIGS. 12 and 13 as another divergent functional arrangement 124, in which a rear side wall 126 follows a contour of the vehicle fuselage, and here is exemplarily shaped like a circular arc. A volume section 128 that fades away owing to the curvature is located predominantly over the toilet 46, so that a user 27 seated on it or standing in front of it is presented with no impediment.

The volume section 128 may further also be used as a stowage compartment 129 denoted by dashed lines, for example when a functional module is used as a module at several locations inside a cabin. While functional arrangements 124 lying laterally outward absolutely must comprise a curved wall, this is not required for centrally located functional arrangements. Nonetheless, similar functional arrangements 124 may also be placed centrally in the fuselage, so that the resultantly freed up installation space in the form of a volume section 128 may be filled with things for which no overhead stowage compartment need instead be sacrificed. For example, there is room for emergency equipment, but alternatively also for equipment used to prepare beverages when the volume section 128 is located in particular opposite or next to a galley.

Figure 14:
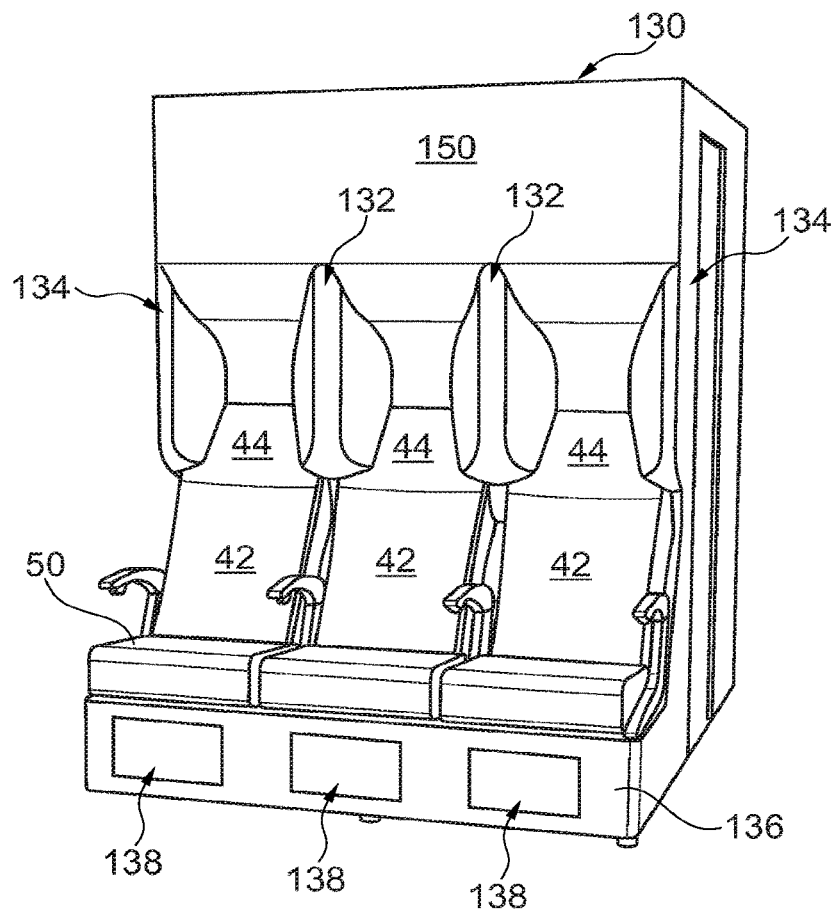
FIGS. 14 to 17 show a further exemplary embodiment of a functional arrangement.

FIG. 14 shows another embodiment of a functional arrangement 130, which may be comparable to the functional arrangement 106 of FIG. 9 and has two washrooms that are separatable from each other through a partition (not shown). A main emphasis on this exemplary embodiment lies in a slightly different design of the bulges 132, which are situated between laterally outer seats 42 and are of a more trapezoidal cross-sectional shape. The seats 42 may be fully reclinable and, when reclined, a passenger (not shown in FIG. 14) nests between two bulges 132 or an outer bulge 134 and an inner bulge 132.

The functional arrangement 130 also comprises a pedestal 136, onto which seat surfaces 50 rest. In this pedestal 136, stowage compartments 138 accessible from a front side may be usable for stowing personal items of a passenger or, the pedestal 136 may be accessible for stowing items not associated with passengers.

Figure 15:
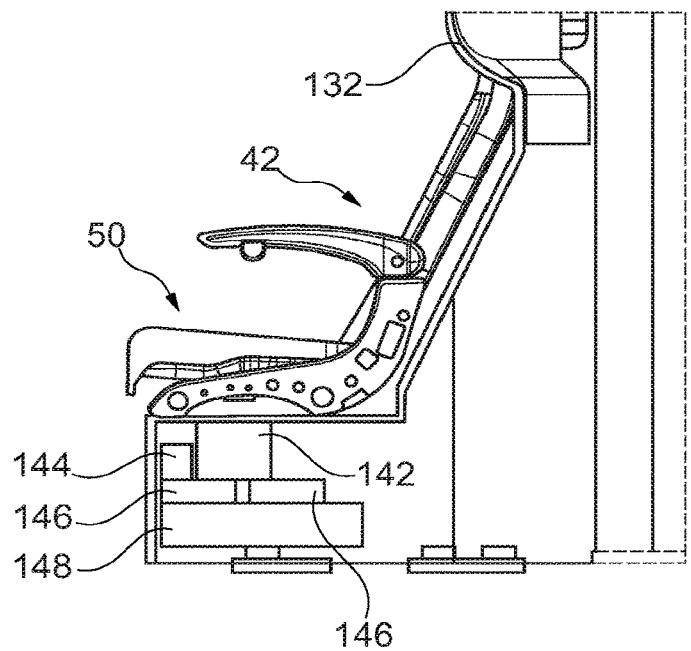

For example, as shown in FIG. 15, which illustrates a sectional, lateral view, the pedestal 136 may be used for stowing a fire extinguisher 142, flashlights 144, crew life vests 146 and protective breathing equipment (PBE) 148 for crew members.

However, lateral bulges 134 may also be used for stowing fire extinguishers.

The surface areas of the bulges 132 and 134 may comprise an acoustically optimized material, such that a passenger in a reclined position may enjoy a low noise level, which in turn increases the passenger comfort.

A surface area 150 above the bulges 132 and 134 is flush with the forward most edges of the bulges 132 and 134 and is essentially planar so as to provide an optimized transition for hat racks that follow on from the surface area 150 in a viewing or seating direction.

Figure 16:
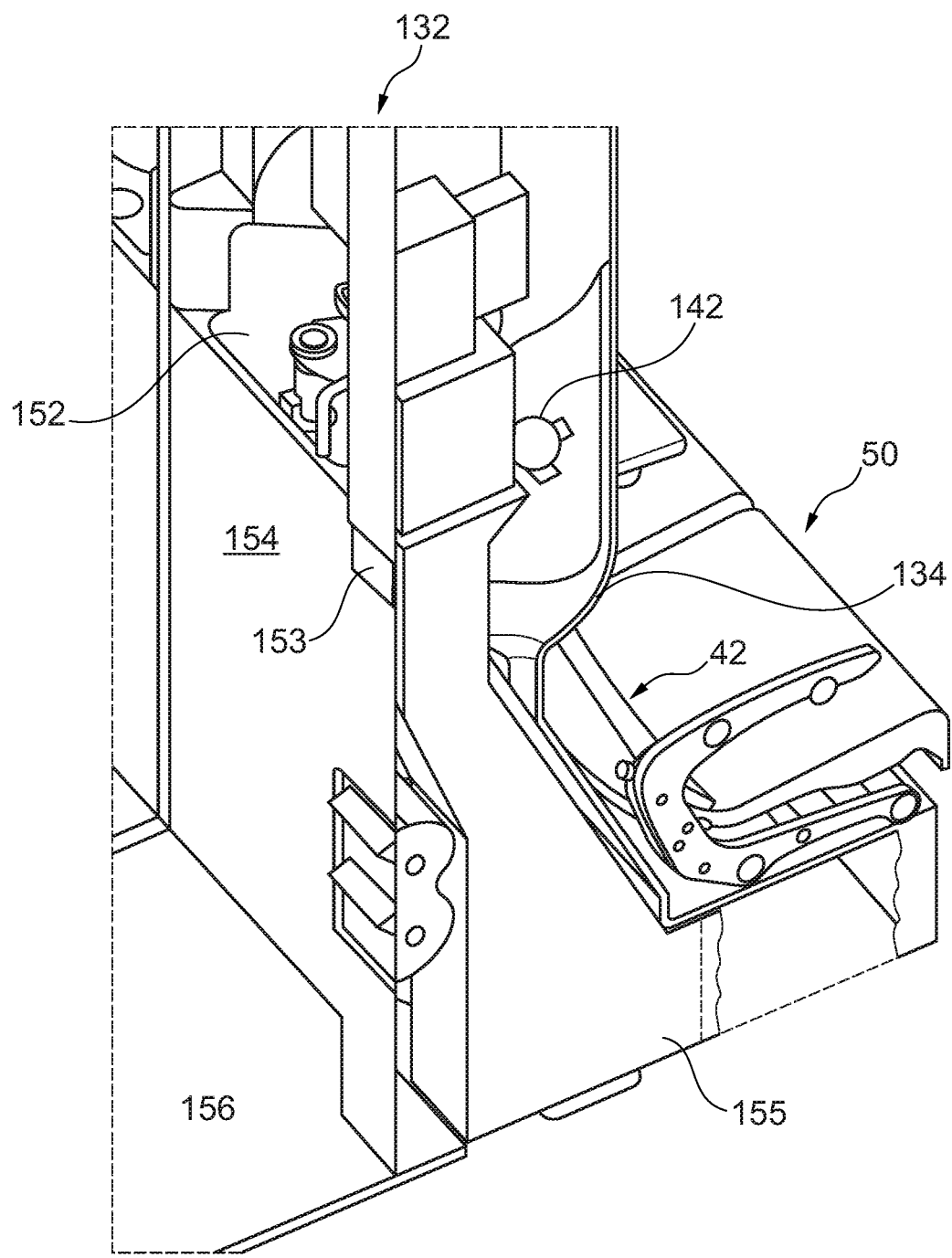

FIG. 16 shows a partial interior view of the functional arrangement 130. Here, it is illustrated that a bulge 132 receives a wash basin 152, which comprises a substantially trapezoidal contour and nests completely inside the respective bulge 132. Following on in a vertical, downward direction, an interior wall 154 is present, which extends down to a floor 156 of the functional arrangement 130. The height of the wall 154, the position of the wash basin 152 and its depth are designed so as to provide an acceptable operating height, which is usable by passengers that are in a lower region of possible body heights. The wash basin 152 comprises a straight inner delimiting edge, such that a partition inside the functional arrangement 130 may be moved between at least two positions, thereby allowing to convert the functional arrangement 130 into a toilet usable by a person with a disability.

Directly adjacent to the wash basin 152, a waste flap 153 may be located, which leads into a waste bin 155 accessible from outside the functional arrangement 132. This may be realized on both sides of the functional arrangement 132, as apparent in FIG. 17, where two separate compartments are shown, which are mirror-inverted. A lateral bulge 134 may also be used for holding a fire extinguisher 142, as schematically shown.

Figure 17:
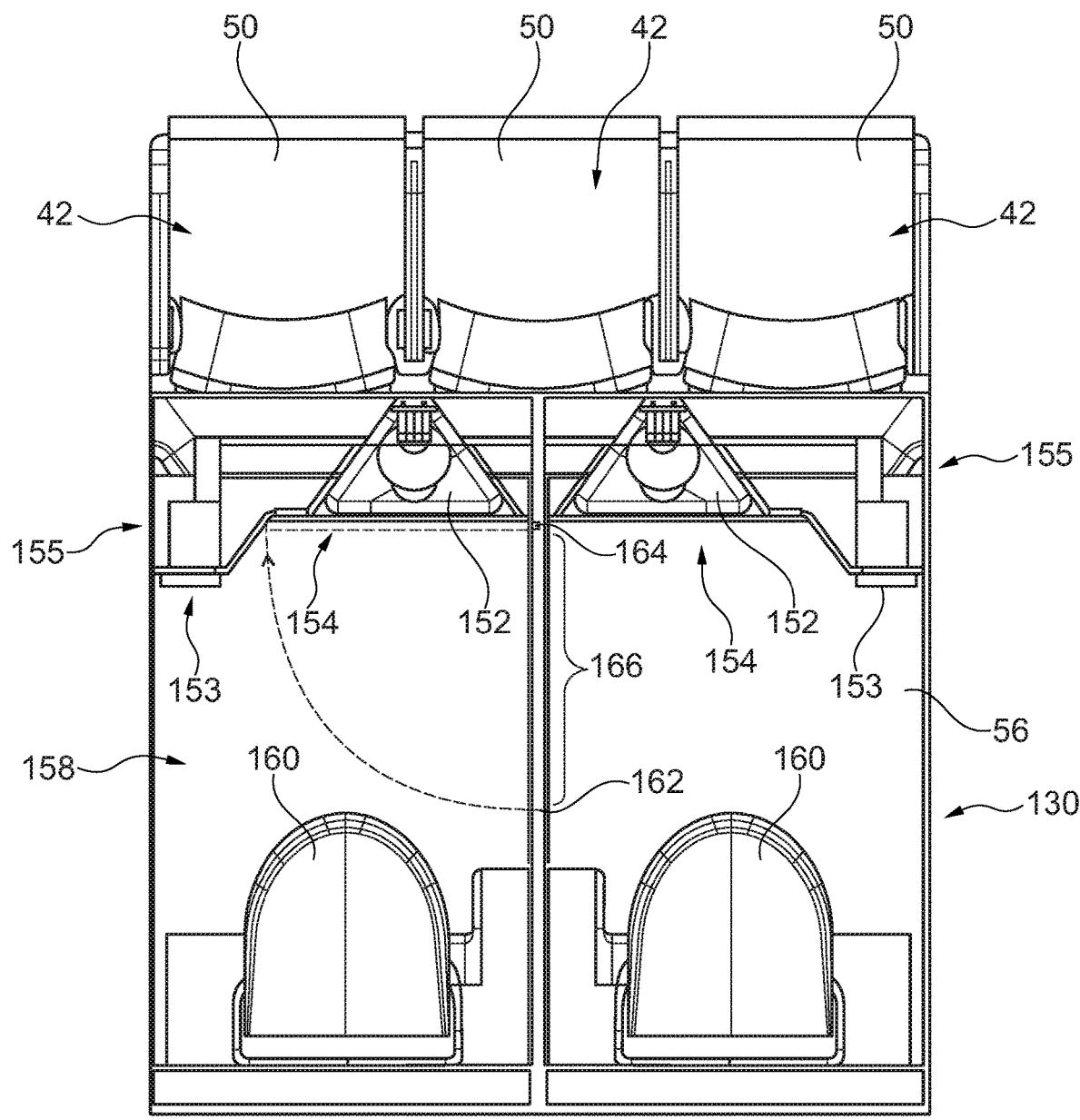

FIG. 17 shows the functional arrangement 130 in a top sectional view, where the shape of washbasins 152 is clearly apparent. The functional arrangement 130 comprises a first toilet compartment 156 and a second toilet compartment 158, in which each a toilet 160 is arranged facing to the washbasin 152 and to the passenger seats 42. A partition wall 162 is arranged between both compartments 156 and 158 and may optionally be swivably mounted on a hinge 164, such that a section 166 of the partition wall 162 may rest flushly on the wall 154 below the left washbasin 152 or, alternatively, on the wall 154 of the right washbasin 152.

Figure 18:
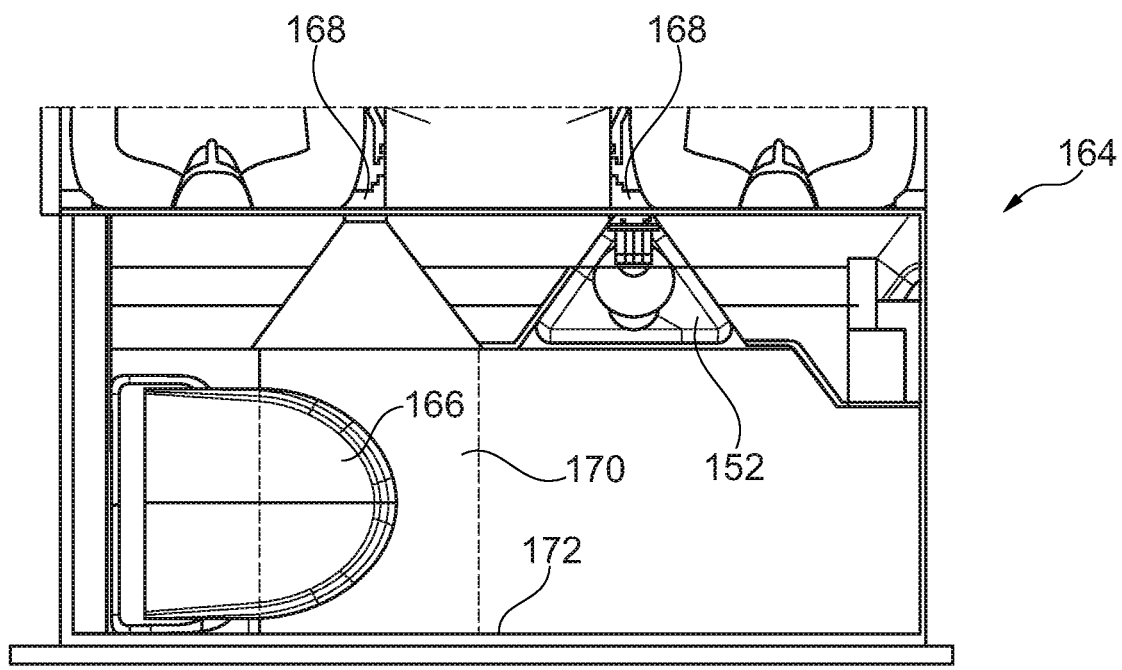
FIG. 18 shows a still further, very compact exemplary embodiment of a functional arrangement.

FIG. 18 shows another embodiment of a functional arrangement 164, which is much more compact than the functional arrangements presented before, since here, a toilet 166 is arranged in a lateral direction. One bulge 168 receives a washbasin 152, while another bulge 168 located further to the toilet 166 may be empty, such that, for example, a surface 170 may be swiveled from a wall 172 opposite to the bulges 168 over the toilet 166, so as to provide a nursing table.

Figure 19:
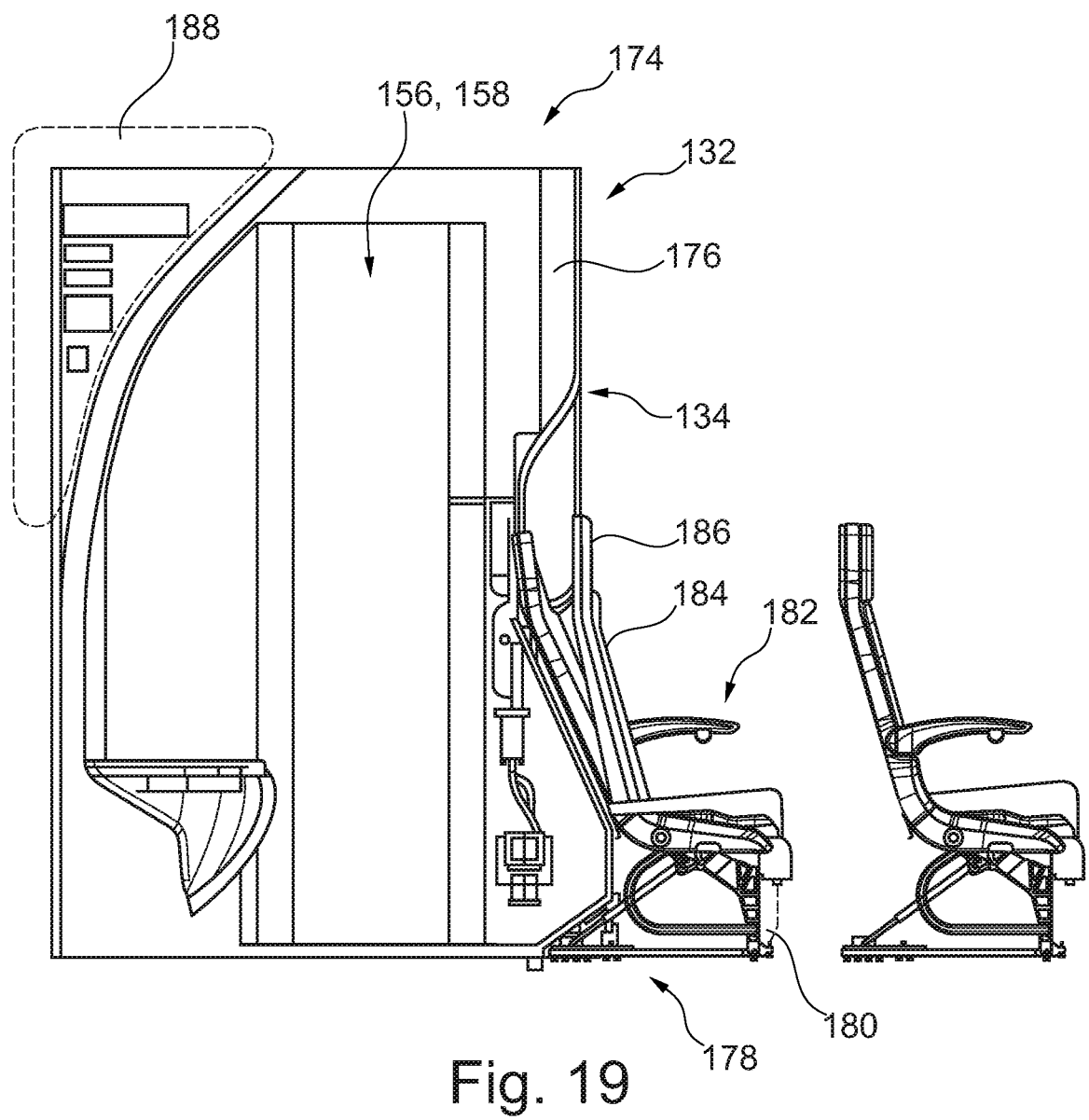
FIG. 19 shows a functional arrangement with a modified housing for re-using common passenger seats.

Finally, FIG. 19 shows a still further functional arrangement 174, which comprises a housing 176 that is designed very similar to FIGS. 14 to 17 and comprises bulges 132 and 134 as well as a similar layout in the toilet compartments 156 and 158. However, instead of providing a pedestal 136, a recess 178 is present, which allows to provide an additional installation space 180 (dashed line) to install common aircraft seats 182 in front of the housing 176, such that back rests 186 and head rests 186 are provided in a very similar position than seats 42 arranged on a pedestal 136. It goes without saying that the additional installation space 180 cannot be used for providing further stowage space or installation space for equipment associated with the toilet compartments 156 and 158. Instead, an additional space 188 may be provided at an upper rearward portion of the housing 176.

In addition, let it be noted that "comprising" does not preclude any other elements or steps, and that "a" or "an" do not rule out a plurality. Let it further be noted that features described with reference to one of the above exemplary embodiments may also be used in combination with other features from other exemplary embodiments described above. Reference numbers in the claims are not to be construed as a limitation.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A functional arrangement in a cabin of a vehicle, the functional arrangement comprising:
   a monument with a housing comprising side walls, which define an interior space; and
   at least two adjacently arranged seats, each having a backrest and headrest, wherein the seats adjoin an exterior side of a first side wall of the housing and comprise a seating direction facing away from the first side wall;
   wherein the first side wall comprises a first surface portion, which is located at least sectionally behind the headrests of the at least two seats and comprises at least one bulge extending at least in a horizontal direction between the headrests of two adjacent seats, and a second surface portion, which is positioned underneath the first surface portion, is pivoted in relation to the first surface portion around a horizontal axis parallel to the first surface portion so as to be inclined with respect to the first surface portion, and is located behind the backrests of the at least two seats;
   wherein the bulge does not extend in a vertical direction onto the second surface portion; and
   wherein at least one piece of equipment is situated in the interior space, extends into the at least one bulge, and is usable in the interior space of the monument.

2. The functional arrangement of claim 1, wherein the bulge comprises a first vertical section, which has an essentially constant first profile cross section lying in a horizontal plane.

3. The functional arrangement of claim 2, wherein the first profile cross section comprises a circular arc extending away from the interior space.

4. The functional arrangement of claim 2, wherein the first profile cross section comprises a flattened or rounded triangle or a symmetrical trapezoid with at least partially rounded corners.

5. The functional arrangement of claim 2, wherein the bulge comprises an outlet area, which is situated underneath the first vertical section and incorporates a profile cross section that runs out from the first profile cross section into the first surface portion.

6. The functional arrangement of claim 5, wherein a lower end of the outlet area lies between the headrests of the at least two passenger seats.

7. The functional arrangement of claim 1, wherein the housing comprises an interior floor located vertically above a cabin floor, on which the housing rests.

8. The functional arrangement of claim 1, wherein the second surface portion extends beyond the first surface portion, relative to the interior space.

9. The functional arrangement of claim 1, wherein a respective side wall of the side walls directly adjoining a toilet in the interior space comprises a curvature, so that the respective side wall extends over the toilet, and wherein an exterior side of the respective side wall accommodates a stowage compartment, such that the housing, including the interior space and the stowage compartment, has essentially a rectilinear shape.

10. The functional arrangement of claim 1, wherein the at least one piece of equipment comprises at least one element from a group of elements, with the group comprising: a wash basin; a stowage compartment; a soap dispenser; a towel dispenser; a toilet seat cover dispenser; a sickness bag dispenser or stowage compartment; a compartment for keeping toilet paper; and a trash receptacle.

11. The functional arrangement of claim 1, comprising at least one foldably or pivotably mounted tread on a first inner wall, which is adjacent to, or a constituent part of, the first side wall, the tread being configured for selectively elevating a vertical position of a user in the interior space of the housing.

12. The functional arrangement of claim 11, wherein the first inner wall comprises a base area, which is offset toward the first side wall or runs at an inclination from a floor of the housing in the direction of the interior space.

13. The functional arrangement of claim 1, wherein the interior space is designed as a washroom.

14. A passenger cabin for a vehicle, the passenger cabin comprising:
   a plurality of seats; and
   at least one functional arrangement comprising:
      a monument with a housing comprising side walls, which define an interior space; and
      at least two adjacently arranged seats each having a backrest and headrest, wherein the seats adjoin an exterior side of a first side wall of the housing and comprise a seating direction facing away from the first side wall;
      wherein the first side wall comprises a first surface portion, which is located at least sectionally behind the headrests of the at least two seats and comprises at least one bulge extending at least in a horizontal direction between the headrests of two adjacent seats, and a second surface portion, which is positioned underneath the first surface portion, is pivoted in relation to the first surface portion around a horizontal axis parallel to the first surface portion so as to be inclined with respect to the first surface portion, and is located behind the backrests of the at least two seats;

wherein the bulge does not extend in a vertical direction onto the second surface portion; and wherein at least one piece of equipment is situated in the interior space, extends into the at least one bulge, and is usable in the interior space of the monument.

15. The passenger cabin of claim 14, wherein the at least one functional arrangement is positioned in a door area of the passenger cabin.

* * * * *